(12) United States Patent
Hoffmann et al.

(10) Patent No.: US 6,874,851 B2
(45) Date of Patent: Apr. 5, 2005

(54) SEAT FOR A SUSPENDED ROPE

(75) Inventors: Günter Hoffmann, Velbert (DE); Josef Theunissen, Lüdenscheid (DE)

(73) Assignee: Trelogo KG, Kerpen (DE)

( * ) Notice: Subject to any disclaimer, the term of this patent is extended or adjusted under 35 U.S.C. 154(b) by 0 days.

(21) Appl. No.: 10/618,605

(22) Filed: Jul. 15, 2003

(65) Prior Publication Data
US 2004/0108759 A1 Jun. 10, 2004

(30) Foreign Application Priority Data
Dec. 7, 2002 (DE) .......................... 102 57 307

(51) Int. Cl.$^7$ ............................................. A47D 13/10
(52) U.S. Cl. ................ 297/273; 297/463.1; 297/463.2; 472/118
(58) Field of Search ............................. 297/273, 463.1, 297/463.2; 273/118, 122

(56) References Cited

U.S. PATENT DOCUMENTS

| | | | |
|---|---|---|---|
| 2,193,236 A | | 3/1940 | Meighan |
| 3,261,607 A | * | 7/1966 | Horowitz et al. ........... 472/118 |
| 3,294,196 A | * | 12/1966 | Rabelos ....................... 182/100 |
| 3,712,614 A | * | 1/1973 | Sherman et al. ............ 472/118 |
| 3,826,492 A | * | 7/1974 | Hagan ......................... 472/118 |
| 3,937,463 A | * | 2/1976 | Soisson ....................... 472/118 |
| 5,338,260 A | * | 8/1994 | Smith .......................... 472/118 |
| 5,427,575 A | * | 6/1995 | Berk ............................ 472/118 |

FOREIGN PATENT DOCUMENTS

| | | |
|---|---|---|
| DE | 81 04 436 | 8/1981 |
| DE | 85 15 323 | 10/1985 |
| DE | 37 43 404 | 7/1989 |
| DE | 198 59 001 | 7/2000 |

* cited by examiner

Primary Examiner—Laurie K. Cranmer
(74) Attorney, Agent, or Firm—Paul Vincent

(57) ABSTRACT

A seat eliminates any danger of accident during use when attached to a suspended rope. A plate-shaped seat body (1) has an axial passage (3) and a horizontal channel (14) disposed outside of the passage (3). The rope (7) is passed through the passage (3) and has a radial section (16) which is guided over the lower side of the seat body (1) and through the channel (14) and the rope end (17) is passed beneath the radial section (16) to form a knot.

8 Claims, 1 Drawing Sheet

SEAT FOR A SUSPENDED ROPE

This application claims Paris Convention priority of DE 102 57 307.7 filed Dec. 7, 2002 the complete disclosure of which is hereby incorporated by reference.

BACKGROUND OF THE INVENTION

The invention concerns a seat for a suspended rope.

Ropes or climbing ropes are suspended from the ceiling of gymnasiums and are used for differing exercises. They can be implemented in various ways as climbing ropes, swinging ropes or the like. Swinging on a rope having a knot as a seat is uncomfortable and has a high risk of accidents, since the athlete may slide off and be injured. For this reason, knots in climbing ropes are generally prohibited.

It is the underlying purpose of the present invention to provide a seat which eliminates risk of accident and which facilitates use of the rope.

SUMMARY OF THE INVENTION

This object is achieved in accordance with the invention by a plate-shaped seat body having an axial passage and a horizontal channel disposed outside of the passage, wherein a radial section of the rope, extending through the passage, is guided over the lower side of the seat body and through the channel and the rope end is passed beneath the radial section to form a knot.

The invention differs from prior art in that the rope is guided centrally through the seat. The rope end is guided through a channel on the lower side and knotted. This provides frictional engagement of the rope with a retaining force which increases with increasing tension.

The seat body is fashioned from a stable and durable hollow member.

The hollow member has a stepped section disposed outside of the passage for fastening the rope to the seat body.

The stepped section is covered in the radial direction by a bridge to form the channel to knot the rope and support the seat.

Stable retention and securing of the bridge is realized by a substantially L-shaped bridge comprising a radial and an axial arm, wherein an eyelet ring in the radial arm engages an annular recess formed on the lower side of the hollow member, concentrically to the passage and a front flange of the axial arm engages a receiving portion of the hollow member disposed at the base of the stepped section.

Slip-free use of the seat is facilitated when the upper side of the seat body has nubs or grooves, in particular circular grooves.

In a preferred embodiment of the invention, means are provided for attaching the bridge to the seat body. This feature has the advantage of permitting separate manufacture of the bridge and the seat body to considerably simplify manufacture of the seat. The two separate members are then assembled and held together using the attaching means. Attachment is preferably effected using screws.

In further preferred embodiment, the radial arm of the bridge defines two outer recesses disposed on opposite sides of the bridge within which the rope seats after formation of the knot. This feature keeps the knot securely fixed to the seat to prevent radial slippage of the rope relative to the seat.

The drawing illustrates one embodiment of the invention.

DESCRIPTION OF THE PREFERRED EMBODIMENT

Figure 1:
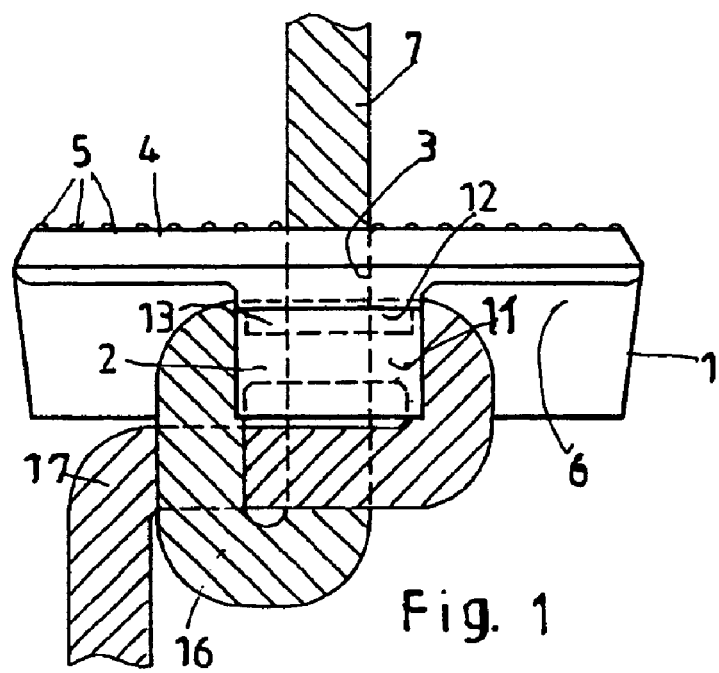
FIG. 1 shows a view of the seat fastened to a rope.
Figure 2:
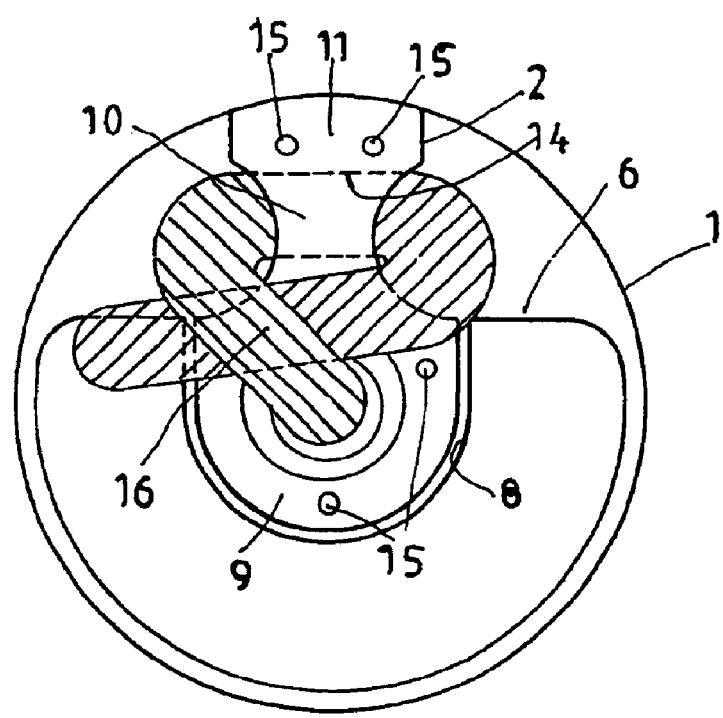
FIG. 2 shows a bottom view of FIG. 1.

FIG. 1 shows a side view of the seat body. The seat body comprises a hollow member 1 which is blown or injection-molded from a thermoplastic material, as well as a bridge 2 formed from an injection-molded thermoplastic material. The hollow member 1 has a central axial passage 3 for a rope 7 and has nubs 5 or grooves, in particular circular grooves, on its upper side 4 to prevent sliding or slipping when sitting or standing on the upper side. The hollow member 1 has a stepped section 6 outside of the central passage 3 which is formed in the lower side and which has a depth which is larger than the diameter of the rope 7.

The bridge 3 is substantially L-shaped and comprises a radial arm 10 and an axial arm 11. An annular recess 8 is formed on the lower side of the hollow member 1 concentrically to the passage 3, into which an eyelet ring 9 of the radial arm 11 can be inserted. The end flange 12 of the axial arm 11 engages over a receiving portion 13 of the hollow member 1 formed on the base of the stepped section 6. The bridge 3 and the stepped section 6 thereby define a channel 14 which is disposed outside of the passage 3 inside the horizontal extent of the hollow member 1. The bridge 3 is connected to the hollow member 3 via screws 15.

The seat is mounted to the rope 7 by inserting the rope 7 through the passage 3. A radial section 16 of the rope 7 is passed through the channel 14 and the end 17 of the rope 7 is guided beneath the radial section 16 to form a knot thereby fastening the seat to the rope. Loading the seat continuously tightens the rope.

The diameter of the seat body is smaller than the size of the rump of a user to prevent seat bodies of various ropes from contacting each other or hitting neighboring users when the users are moving.

We claim:

1. A seat for a suspended rope, the seat comprising:
   a plate-shaped seat body having an axial passage for the rope; and
   means cooperating with said seat body to define a horizontal channel, said horizontal channel disposed external to said axial passage, whereby the seat is attached to the rope by inserting a free end of the rope through said axial passage and then bending the rope end back in an upward direction while leaving a gap between the rope and an outer, lower portion of said channel, and then passing the rope end through said channel and through said gap thereby forming a knot in the rope at a lower side of said seat body and said channel, wherein said seat body has a stepped section disposed outside of said axial passage, said stepped section being covered in a radial direction by a bridge to form said channel, wherein said bridge is substantially L-shaped and comprises a radial arm and an axial arm, wherein an eyelet ring of the radial arm engages an annular recess formed on a lower side of said seat body concentrically to said passage, wherein the axial arm has an end flange which engages on a receiving section of said seat body formed on a base of said stepped section.

2. The seat of claim 1, wherein said seat body is formed as a hollow member.

3. The seat of claim 1, wherein an upper side of said seat body has nubs or grooves.

4. The seat of claim 3, wherein said nubs or grooves are circular.

5. The seat of claim 1, further comprising means for attaching said bridge to said seat body.

6. The seat of claim 5, wherein said attaching means comprise screws.

7. The seat of claim 1, wherein said radial arm of said bridge defines two outer recesses disposed on opposite sides of said bridge within which the rope seats after formation of said knot.

8. The seat of claim 1, wherein said seat body and said bridge are injection moulded bodies.

* * * * *